(12) United States Patent
St-Laurent

(10) Patent No.: US 11,466,590 B1
(45) Date of Patent: Oct. 11, 2022

(54) MID-TURBINE FRAME WITH INTERMEDIARY PLENUM

(71) Applicant: PRATT & WHITNEY CANADA CORP., Longueuil (CA)

(72) Inventor: Gabriel St-Laurent, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/350,623

(22) Filed: Jun. 17, 2021

(51) Int. Cl.
*F01D 9/06* (2006.01)
*F01D 25/14* (2006.01)
*F01D 25/12* (2006.01)
*F01D 25/24* (2006.01)

(52) U.S. Cl.
CPC ............. *F01D 25/14* (2013.01); *F01D 9/065* (2013.01); *F01D 25/12* (2013.01); *F01D 25/243* (2013.01); *F05D 2240/14* (2013.01); *F05D 2260/232* (2013.01); *F05D 2260/606* (2013.01)

(58) Field of Classification Search
CPC ........ F01D 9/065; F01D 25/12; F01D 25/243; F04D 25/14; F05D 2240/14; F05D 2260/232; F05D 2260/606
See application file for complete search history.

(56) References Cited

U.S. PATENT DOCUMENTS

| 4,126,405 | A | * | 11/1978 | Bobo | F01D 9/042 |
| | | | | | 415/115 |
| 6,183,193 | B1 | * | 2/2001 | Glasspoole | F01D 5/08 |
| | | | | | 415/115 |
| 9,803,501 | B2 | * | 10/2017 | Wang | F01D 25/162 |
| 10,087,782 | B2 | * | 10/2018 | Wang | F01D 9/065 |
| 10,273,812 | B2 | * | 4/2019 | Huppe | F01D 5/187 |
| 2007/0059158 | A1 | * | 3/2007 | Alvanos | F01D 5/081 |
| | | | | | 415/115 |
| 2016/0108748 | A1 | * | 4/2016 | Harris | F01D 9/04 |
| | | | | | 415/177 |
| 2021/0140344 | A1 | * | 5/2021 | Lefebvre | F01D 25/18 |

* cited by examiner

*Primary Examiner* — Igor Kershteyn
(74) *Attorney, Agent, or Firm* — Norton Rose Fulbright Canada LLP

(57) ABSTRACT

A gas turbine engine has: a high-pressure turbine; a low-pressure turbine (LPT) having a LPT outer case and a LPT plenum extending around a central axis; a mid-turbine frame (MTF) assembly connecting the low-pressure turbine and the high-pressure turbine, the MTF assembly having: a MTF outer case defining an inlet for connection to a source of the cooling air, an intermediary plenum fluidly connected to the source of cooling air via the inlet, the intermediary plenum having a first air outlet and a second air outlet, and a MTF plenum disposed radially inwardly of the MTF outer case and fluidly connected to the source of the cooling air via the first air outlet of the intermediary plenum; and a cooling air conduit fluidly connecting the second air outlet of the intermediary plenum to the LPT plenum while bypassing the MTF plenum.

20 Claims, 5 Drawing Sheets

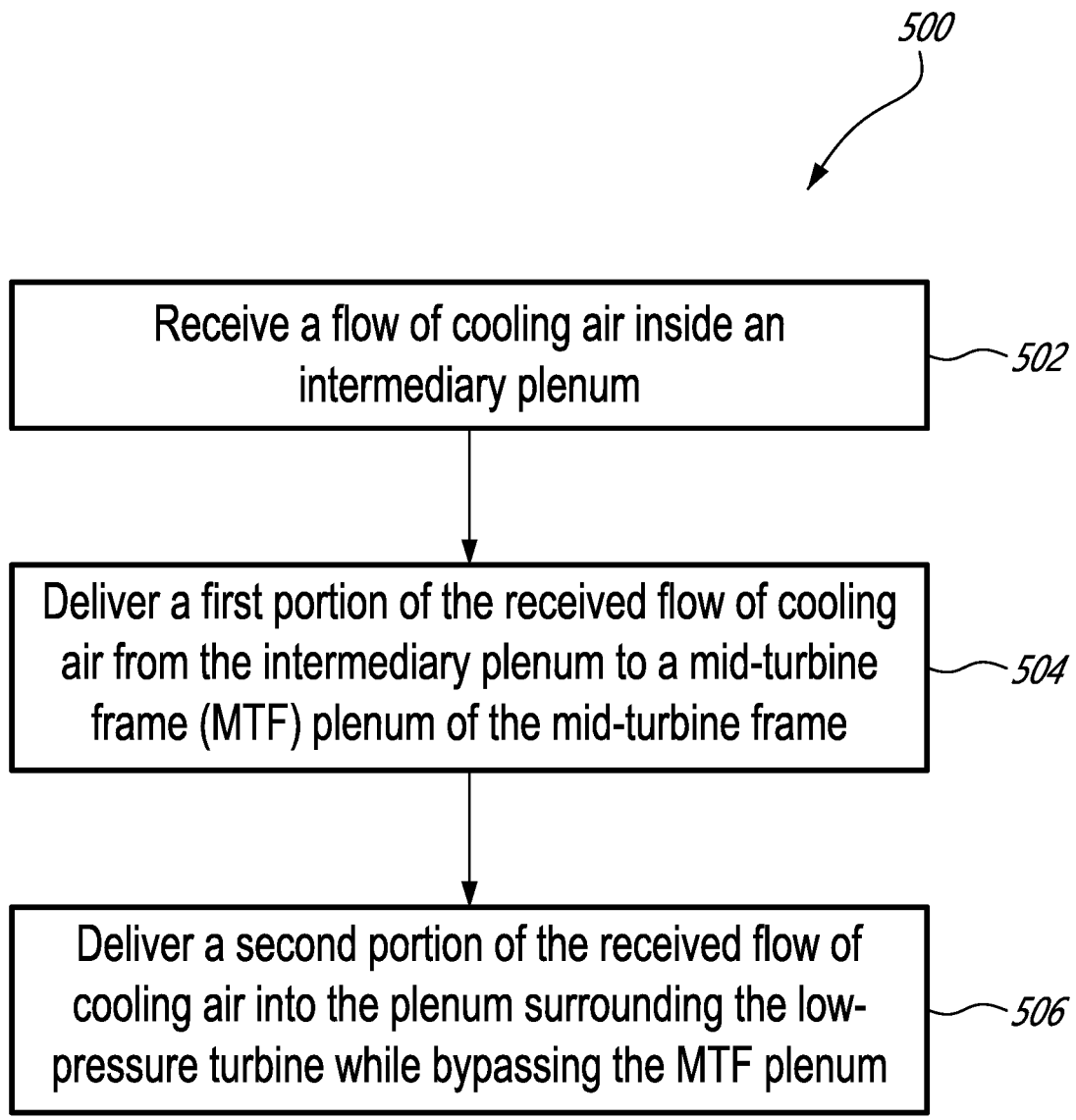

MID-TURBINE FRAME WITH INTERMEDIARY PLENUM

TECHNICAL FIELD

The application relates generally to aircraft engines and, more particularly, to secondary air systems used to cool components of turbine sections of such engines.

BACKGROUND

Many aircraft engines, and more specifically gas turbine engines, include a mid-turbine frame (MTF) assembly located between high and low pressure turbines (HPT and LPT) to support bearings and to transfer loads radially outwardly to a core engine casing. The mid-turbine frame assembly typically comprises a mid-turbine frame supporting an annular inter-turbine duct therein. Secondary air is introduced around the inter-turbine duct and into hollow struts for cooling and other purposes. Secondary air is also used to pressurize and cool the bearings supported by the mid-turbine frame assembly. The secondary air may be injected into a plenum of the mid-turbine frame assembly for delivery to other components. This plenum may be sealed from an environment outside thereof with seals. Cooling may be affected by sealing effectiveness of these seals. Hence, improvements are sought.

SUMMARY

In one aspect, there is provided a gas turbine engine comprising: a high-pressure turbine; a low-pressure turbine (LPT) downstream of the high-pressure turbine and having a LPT outer case and a LPT plenum extending circumferentially around a central axis, the LPT plenum distributing cooling air around the low-pressure turbine; a mid-turbine frame (MTF) assembly connecting the low-pressure turbine and the high-pressure turbine, the MTF assembly having: a MTF outer case defining an inlet for connection to a source of the cooling air, an intermediary plenum fluidly connected to the source of cooling air via the inlet, the intermediary plenum having a first air outlet and a second air outlet, and a MTF plenum disposed radially inwardly of the MTF outer case and fluidly connected to the source of the cooling air via the first air outlet of the intermediary plenum; and a cooling air conduit fluidly connecting the second air outlet of the intermediary plenum to the LPT plenum while bypassing the MTF plenum.

The gas turbine engine may include any of the following features, in any combinations.

In some embodiments, the intermediary plenum is located radially inwardly of the MTF outer case relative to the central axis.

In some embodiments, two protrusions are axially spaced apart from one another relative to the central axis and extending from the MTF outer case in a direction having a radial component relative to the central axis, the two protrusions extending circumferentially around the central axis, the intermediary plenum being disposed between the two protrusions.

In some embodiments, an annular plate is sealingly engaged to distal ends of the two protrusions, the intermediary plenum located radially between the annular plate and the MTF outer case and axially between the two protrusions.

In some embodiments, the first air outlet is a first aperture defined through a first protrusion of the two protrusions, the second air outlet is a second aperture defined through a second protrusion of the two protrusions.

In some embodiments, the first aperture includes a plurality of first apertures distributed around the central axis, the second aperture including a plurality of second apertures distributed around the central axis.

In some embodiments, the cooling air conduit includes a plurality of cooling air conduits circumferentially distributed about the central axis.

In some embodiments, each of the plurality of the cooling air conduits is fluidly connected to a respective one of a plurality of apertures defined through the LPT case and distributed around the central axis, each of the plurality of apertures communicating with the LPT plenum.

In some embodiments, the cooling air conduit is defined within a thickness of the MTF outer case.

In some embodiments, an outlet of the cooling air conduit is fluidly connected to a second intermediary plenum, the second intermediary plenum defined between an end of the MTF outer case and a flange of the LPT outer case, the flange of the LPT outer case defining an aperture fluidly connecting the second intermediary plenum to the LPT plenum.

In another aspect, there is provided a mid-turbine frame (MTF) assembly for connecting a low-pressure turbine to a high-pressure turbine of a gas turbine engine, comprising: a MTF outer case extending circumferentially around a central axis, the MTF outer case having an inlet for connection to a source of cooling air; a MTF plenum disposed radially inwardly of the MTF outer case and fluidly connected to the inlet; an intermediary plenum within the MTF plenum, the intermediary plenum having a first outlet and a second outlet, the first outlet fluidly connecting the intermediary plenum to the MTF plenum; and a cooling air conduit fluidly connected to the second outlet of the intermediary plenum, the cooling air conduit fluidly connecting the intermediary plenum to a low-pressure turbine plenum independently of the MTF plenum.

The mid-turbine frame may include any of the following features, in any combinations.

In some embodiments, two protrusions are axially spaced apart from one another relative to the central axis and extending from the MTF outer case in a direction having a radial component relative to the central axis, the two protrusions extending circumferentially around the central axis, the intermediary plenum being disposed between the two protrusions.

In some embodiments, an annular plate is sealingly engaged to distal ends of the two protrusions, the intermediary plenum located radially between the annular plate and the MTF outer case and axially between the two protrusions.

In some embodiments, the first outlet is a first aperture defined through a first protrusion of the two protrusions, the second outlet is a second aperture defined through a second protrusion of the two protrusions.

In some embodiments, the first aperture includes a plurality of first apertures distributed around the central axis, the second aperture including a plurality of second apertures distributed around the central axis.

In some embodiments, the cooling air conduit includes a plurality of cooling air conduits circumferentially distributed about the central axis.

In some embodiments, the cooling air conduit is defined within a thickness of the MTF outer case.

In yet another aspect, there is provided a method of feeding cooling air to a plenum surrounding a low-pressure turbine (LPT) of a gas turbine engine, the gas turbine engine having a mid-turbine frame (MTF) assembly connecting a high-pressure turbine to the low-pressure turbine, comprising: receiving a flow of cooling air inside an intermediary plenum; delivering a first portion of the received flow of cooling air from the intermediary plenum to a mid-turbine frame (MTF) plenum of the mid-turbine frame; and delivering a second portion of the received flow of cooling air into the plenum surrounding the low-pressure turbine while bypassing the MTF plenum.

The method may include any of the following features, in any combinations.

In some embodiments, the receiving of the flow of cooling air inside the intermediary plenum includes receiving the flow of cooling air inside the intermediary plenum located inside the MTF plenum.

In some embodiments, the delivering of the second portion of the received flow of cooling air includes flowing the second portion within a plurality of cooling air conduits fluidly connecting outlets of the intermediary plenum to the LPT plenum.

BRIEF DESCRIPTION OF THE DRAWINGS

Reference is now made to the accompanying figures in which:

FIG. 5 is a flow chart illustrating steps of feeding cooling air to a plenum surrounding a low-pressure turbine (LPT) of the gas turbine engine of FIG. 1.

DETAILED DESCRIPTION

Figure 1:
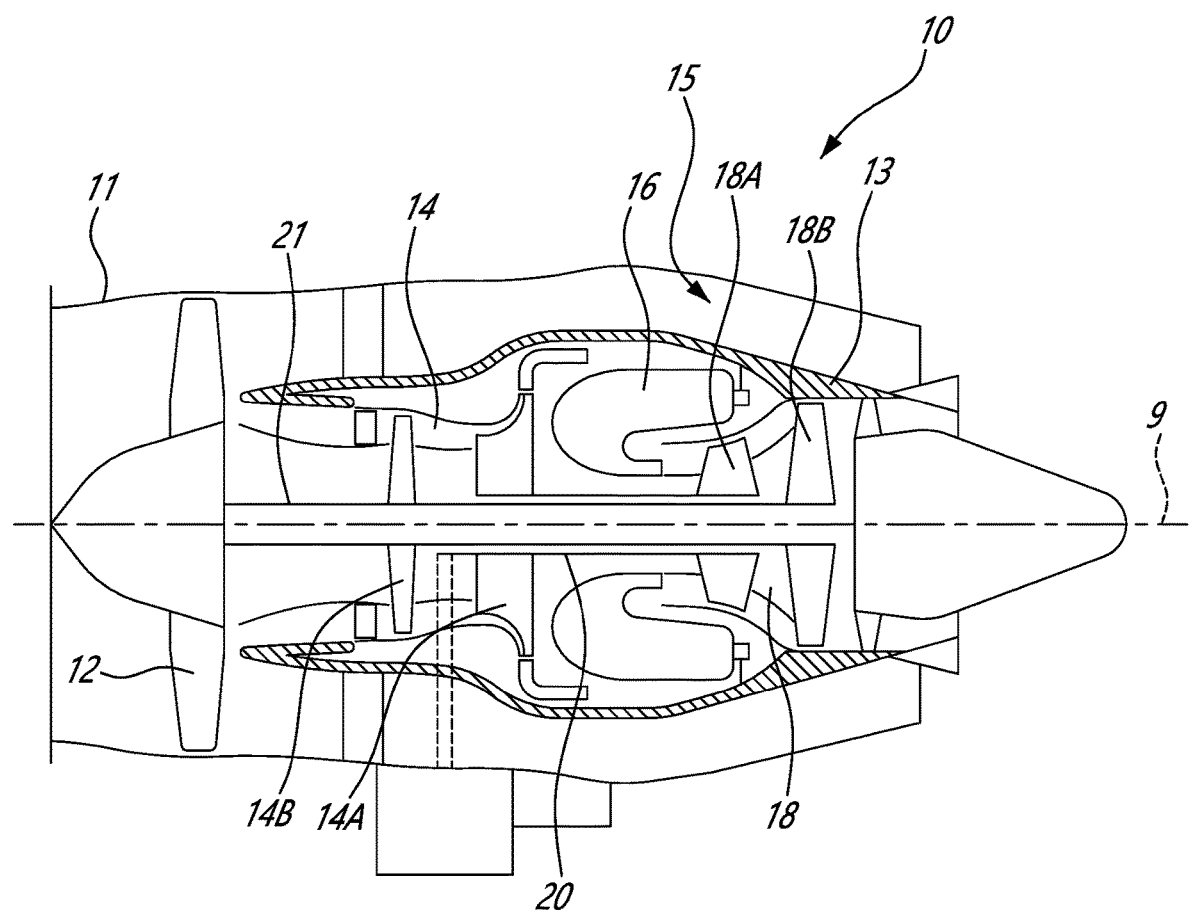
FIG. 1 is a schematic cross sectional view of a gas turbine engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 9 of the gas turbine engine 10.

In the embodiment shown, the gas turbine engine 10 comprises a high-pressure spool having a high-pressure shaft 20 drivingly engaging a high-pressure (HP) turbine 18A of the turbine section 18 to a high-pressure compressor 14A of the compressor section 14, and a low-pressure spool having a low-pressure shaft 21 drivingly engaging a low-pressure (LP) turbine 18B of the turbine section 18 to a low-pressure compressor 14B of the compressor section 14 and drivingly engaged to the fan 12. It will be understood that the contents of the present disclosure may be applicable to any suitable engines, such as turboprops and turboshafts without departing from the scope of the present disclosure.

Figure 2:
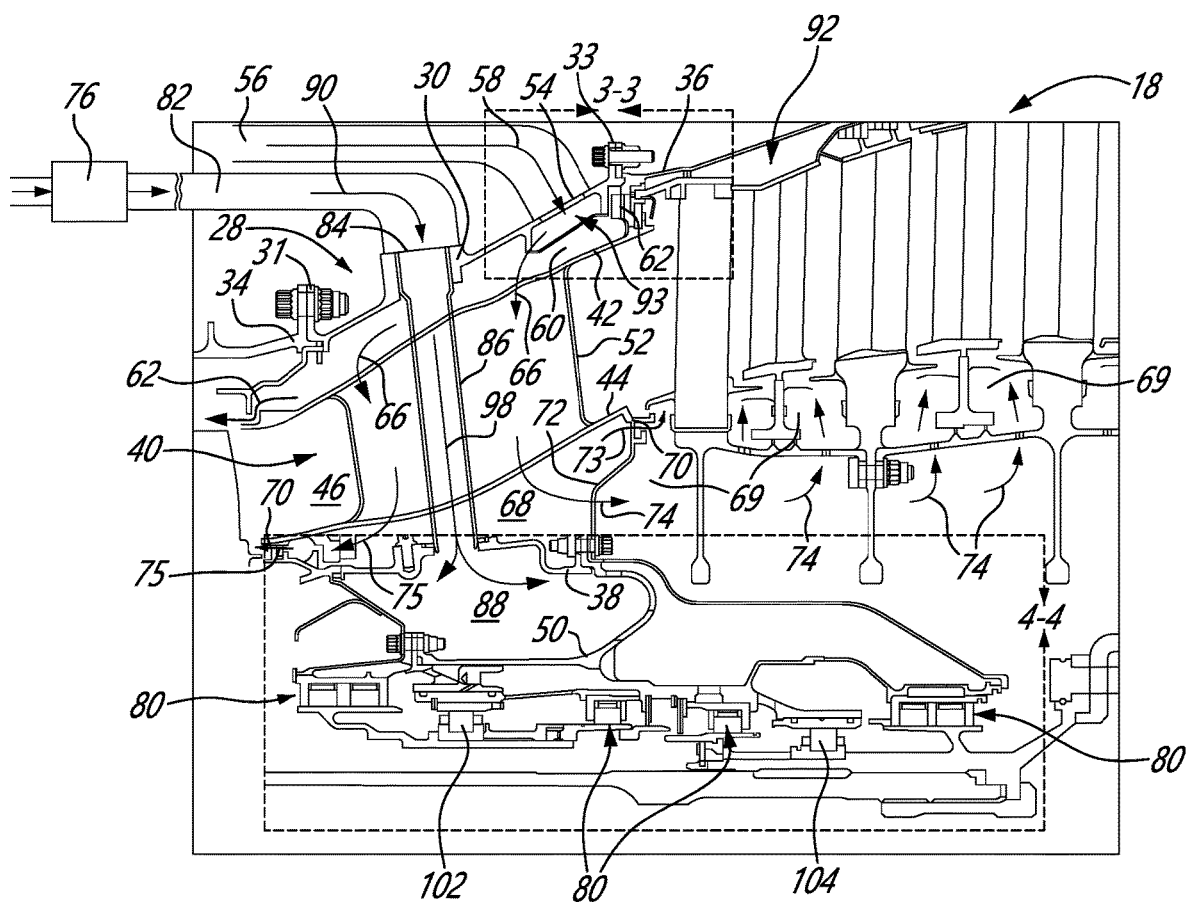
FIG. 2 is a cross-sectional view of a mid-turbine frame assembly disposed between a high-pressure turbine and a low-pressure turbine of the gas turbine engine shown in FIG. 1.

Referring to FIGS. 1-2, the gas turbine engine 10 includes a fan case 11, a core case 13, and an engine by-pass 15 between the fan case 11 and the core case 13. The core case 13 surrounds the low- and high-pressure spools to define a core gas path therethrough. A mid-turbine frame (MTF) assembly 28 is disposed between the HP turbine 18A and the LP turbine 18B and supports a bearing housing 50 containing bearings 102 and 104 around the respective shafts 20, 21. The terms "axial" and "radial" used for various components below are defined with respect to central axis 9.

As shown in FIG. 2, the MTF assembly 28 may comprise an MTF outer case 30. The MTF outer case 30 has a forward mounting flange 31 and an aft mounting flange 33 at both ends with mounting holes therethrough for connection to a HP turbine outer case 34 and a LP turbine outer case 36. The MTF outer case 30, the HP turbine outer case 34, and the LPT outer case 36 may form part of the core casing 13 schematically depicted in FIG. 1. The MTF assembly 28 may further comprise an annular inner case 38 concentrically disposed within the MTF outer case 30. A plurality of load transfer spokes (not shown) may extend radially between the MTF outer case 30 and the annular inner case 38. The annular inner case 38 supports the bearing housing 50. The bearing housing 50 may be bolted or otherwise suitably mounted to the annular inner case 38 as shown in FIG. 2. The loads from the bearings 102 and 104 are transferred to the core casing 13 through the MTF assembly 28.

The MTF assembly 28 may be further provided with an inter-turbine duct (ITD) 40 for directing combustion gases to flow generally axially through the MTF assembly 28. The ITD 40 has an annular outer duct wall 42 and an annular inner duct wall 44. An annular path 46 is defined between the annular outer duct wall 42 and the annular inner duct wall 44 to direct the combustion gases from the HP turbine 18A to the LP turbine 18B. An array of hollow struts 52, which are circumferentially spaced-apart, may extend radially through annular path 46 between the annular outer duct wall 42 and the annular inner duct wall 44. The load transfer spokes may extend through the hollow struts 52. The hollow struts 52 may have an airfoil profile to act as turbine vanes for properly directing the combustion gases to the LP turbine 18B. As shown in FIG. 2, the hollow struts 52 may be open-ended.

Still referring to FIG. 2, first and second secondary air systems may be integrated to the MTF assembly 28 for supplying compressed air through the turbine section 18 of the gas turbine engine 10 for non-propulsion purposes. For instance, the secondary air may be used for cooling and sealing purposes. The arrows in FIG. 2 represent air flow directions. The air of the first system may be used to cool and pressurize the bearing housing 50 whereas the second system may be used to cool the inter-turbine duct, and the HP and LP turbine 18A, 18B.

According to the illustrated embodiment, the second air system may comprise a number of inlet ports 54 defined in the MTF outer case 30 of the MTF assembly 28, the inlet ports 54 being connected to the external lines 56 which are, in turn, connected to a common source of compressed air, such as compressor bleed air (e.g. P2.8 air or P2.9 air). The cooling air may come from an auxiliary power unit (APU) or any other suitable source. It will be appreciated that any suitable number of inlet port(s) 54 are contemplated. For instance, only one inlet port 54 may be provided or a plurality of ports circumferentially distributed around the central axis 9 may be provided as in the present embodiment. According to one embodiment, four inlet ports 54 and four external lines 56 are distributed around the MTF outer case 30. The external lines 56 may be located outside of the core casing 13 where engine temperatures are lower. For instance, the external lines 56 may be disposed between the engine by-pass 15 and the engine core. As shown by arrow 58, the air is discharged from the external lines 56 through the inlet ports 54. Air is then discharged into a MTF plenum 60 defined between the MTF outer case 30 and the annular outer duct wall 42. Forward and aft sealing rings 62 are provided to minimize air leakage from the MTF plenum 60. The MTF plenum 60 may provide for a uniform distribution of pressurized cooling air all around the inter-turbine duct, thereby avoiding local air impingement on the hollow struts 52, which could potentially lead to hot spots. The MTF plenum 60 may extend annularly all around the central axis 9.

As shown in FIG. 2, a portion of the air leaks through the forward sealing ring 62 to pressurize and cool the outer shroud structure of the HP turbine 18A. A portion of the air flows from the MTF plenum 60 radially inwardly through the hollow struts 52, as depicted by arrow 66. The air is discharged from the hollow struts 52 into a second plenum 68 defined between the annular inner duct wall 44 and the annular inner case 38 of the MTF assembly 28. Forward and aft sealing rings 70 are provided to minimize air leakage from the second plenum 68. The back wall of the second plenum 68 may be defined by a baffle 72 extending radially from the annular inner duct wall 44 to the annular inner case 38. Openings are defined in the baffle 72 to allow air to flow in a generally downstream direction from the second plenum 68 to LPT rotor front cavities 69 to pressurize same and provide cooling to LPT rotor drums, as depicted by arrow 74 in FIG. 2. As shown by arrow 73, an amount of pressurized air is also allowed to leak from the second plenum 68 at an interface of aft sealing ring 70 into the LPT rotor front cavities 69 of the first stage LPT rotor. The air that flows along arrows 73 and 74 and that is directed in the LPT rotor front cavities 69 is supplied at a pressure greater than the pressure of the gas path, which may thereby prevent hot gas ingestion. As depicted by arrow 75, an amount of air also flows forwardly out from the second plenum 68 to provide a proper pressure delta at sealing ring 70 while at the same time contributing to the pressurizing of the HPT rear cavity.

As shown in FIG. 2, the other air system may comprise an air cooler 76 connected to a source of compressor bleed air (e.g. P2.8 air or P2.9 air) for providing cooled compressed air to carbon seals 80 used to provide oil retention in bearing cavities of the bearing housing 50. The air cooler 76 may be positioned at various locations in the engine. For instance, the air cooler may be provided outside of the engine core. External lines 82 may be provided for connecting the outlet of the air cooler 76 to inlet ports 84 defined in the MTF outer case 30 of the MTF assembly 28. According to one embodiment, inlet ports 84, two circumferentially spaced-apart ports in the present case, are provided in the MTF outer case 30. Each of the inlet ports 84 is connected to its respective one of the external lines 82. The external lines 82 may be disposed between the engine by-pass and the engine core. A corresponding number of internal pipes 86 are disposed within the hollow struts 52 for directing the cooled compressed air from the inlet ports 84 into a third plenum 88 defined between the annular inner case 38 and the bearing housing 50. As can be appreciated from FIG. 2, the internal pipe 86 extends radially through the second plenum 68 to deliver the second flow of air directly into the third plenum 88. As shown by arrows 90, the air flows from the external lines 82 through the internal pipe 86 into the third plenum 88.

Still referring to FIG. 2, another portion of the air injected in the MTF plenum 60 is used to feed a low-pressure turbine (LPT) plenum 92. It will be appreciated that, in some embodiments, the LPT plenum 92 may alternatively be a cavity and/or a plurality of passages circumferentially distributed around the central axis. This cavity or these passages is/are disposed radially between the LPT outer case 36 and outer shrouds of the vanes and blades of the low pressure turbine 18B. An amount of cooling air reaching the LPT plenum 92 may decrease should sealing effectiveness of the sealing rings 62 of the MTF assembly 28 be compromised, because of wear for instance. In other words, using the MTF plenum 60 as an air supply source for LPT outer case 36 may render the cooling of the LPT outer case 36 susceptible to the sealing efficiency of the sealing rings 62. Reduced sealing ability on the sealing rings 62, which may be due to wear, may reduce a pressure inside the MTF plenum 60 and may therefore have an impact on the cooling air delivered to the LPT plenum 92. This may be detrimental for the LPT outer case 36.

Figure 3:
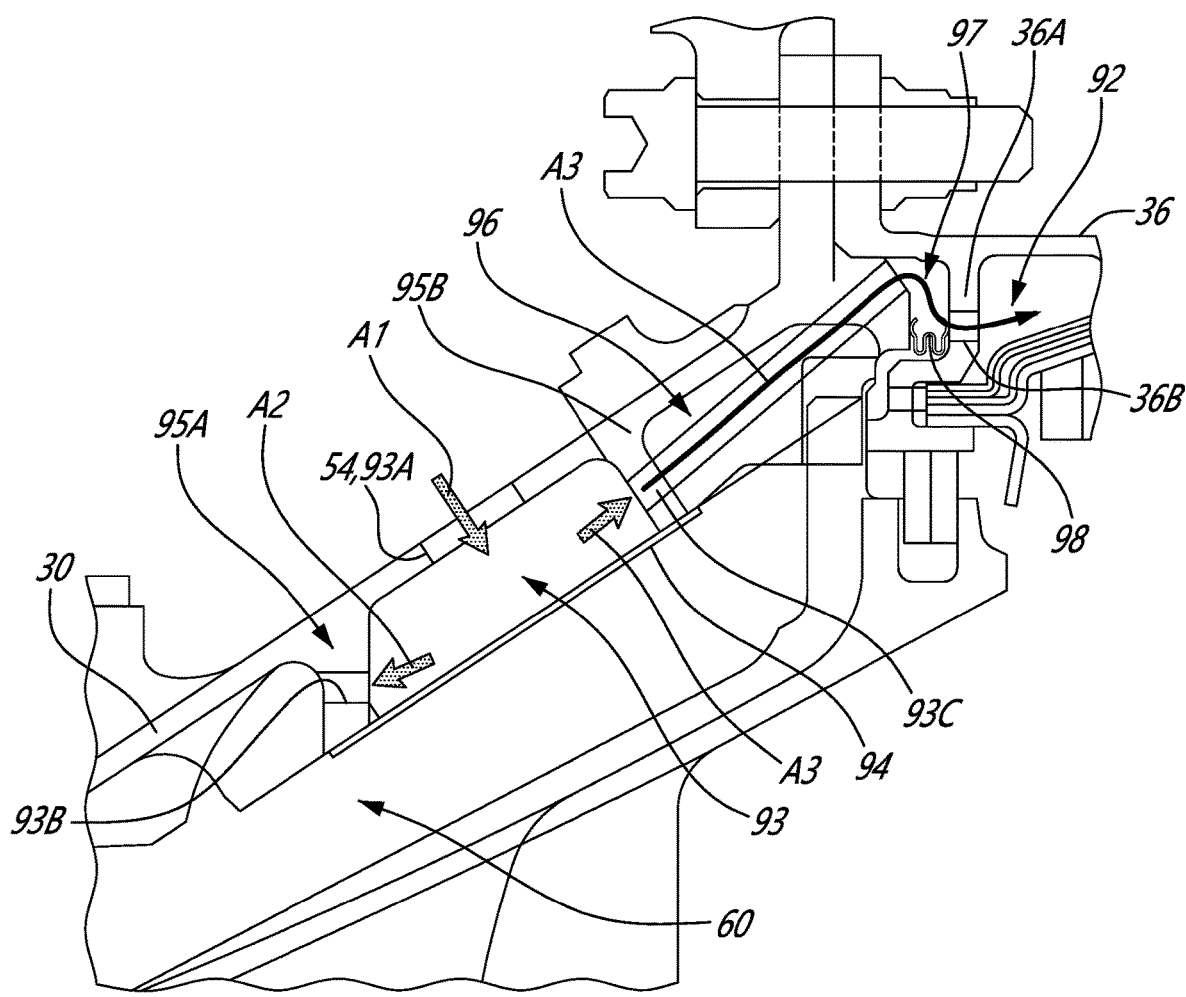
FIG. 3 is an enlarged view of zone 3-3 on FIG. 2.

Referring now to FIGS. 2-3, the MTF assembly 28 includes an intermediary plenum 93 that is defined radially inwardly of the MTF outer case 30 and radially between the MTF outer case 30 and an annular plate 94. The intermediary plenum 93 may be located within the MTF plenum 60. In other words, the intermediary plenum may be a sub-plenum of the MTF plenum 60. The annular plate 94 is sealingly engaged to distal ends of two protrusions, namely a fore protrusion 95A and an aft protrusion 95B. The fore protrusion 95A and the aft protrusion 95B protrude along a direction having a radial component relative to the central axis 9 from the MTF outer case 30 and toward the central axis 9. The intermediary plenum 93 has inlets 93A that correspond to the inlet ports 54 defined in the MTF outer case 30 in the present embodiment. It will be appreciated that the intermediary plenum 93 may have a single inlet or a plurality of circumferentially distributed inlets as in the present embodiment. Each of these inlets 93A may be fluidly connected to a respective one of the external lines 56 (FIG. 2) to receive cooling air therefrom along arrow A1. The annular plate 94 may define apertures to feed the MTF plenum 60 with cooling air.

The intermediary plenum 93 has a first outlet 93B and a second outlet 93C. The first outlet 93B and the second outlet 93C may include a single outlet or a plurality of outlets circumferentially distributed around the central axis 9. In the embodiment shown, the first outlet 93B correspond to an aperture defined through the fore protrusion 95A whereas the second outlet 93C corresponds to an aperture defined through the aft protrusion 95B. The apertures defined through the fore protrusion 95A and the aft protrusion 95B may include a plurality of circumferentially distributed apertures flowing the air from the intermediary plenum 93 to the MTF plenum 60 along arrow A2. Furthermore, the first outlet 93B may be supplemented or replaced by other outlets on annular plate 94 and/or the aft protrusion 95B, as long as they are all fluidly connected to the MTF plenum 60, to supply cooling air from the intermediary plenum 93 to the MTF plenum 60.

The second outlet 93C is used to supply cooling air from the intermediary plenum 93 to the LPT plenum 92 along arrow A3. In the present embodiment, the MTF assembly 28 includes a cooling air conduit 96, which may include one or more conduits circumferentially distributed around the central axis 9. The cooling air conduit 96 is connected to the second outlet 93C of the intermediary plenum 93. The LPT plenum 92 is therefore fluidly connected to the intermediary plenum 93 via the cooling air conduit 96 and independently of the MTF plenum 60. In other words, the air that flows from the intermediary plenum 93 to the LPT plenum 92 bypasses the MTF plenum 60. Independence may therefore be provided between the MTF plenum 60 and the LPT plenum 92.

In the embodiment shown, an outlet of the cooling air conduit 96 is in fluid communication with a second intermediary plenum 97. The second intermediary plenum 97 may be located axially between an axial end of the MTF outer case 30 and a flange 36A defined by the LPT outer case 36. A seal 98, such as a W-seal in the present embodiment or any other suitable seal, may create a sealing engagement between the distal end of the MTF outer case 30 and the flange 36A of the LPT outer case 36. The second intermediary plenum 97 may therefore be located radially between the LPT outer case 36 and the seal 98. The flange 36A of the LPT outer case 36 may define one or more apertures 36B via which the cooling air may flow from the second intermediary plenum 97 to the LPT plenum 92. Hence, in the embodiment shown, the LPT plenum 92 is fluidly connected to the intermediary plenum 93 via the air conduit 96 and via the second intermediary plenum 97. Other configurations without this second intermediary plenum 97 are contemplated.

Feeding the cooling air to the LPT plenum 92 via the intermediary plenum 93 while bypassing the MTF plenum 60 may allow to avoid using external piping and case bosses that may otherwise be required. Hence, weight savings may be achieved with this configuration. Feeding the cooling air to the LPT plenum 92 via the intermediary plenum 93 may increase tolerance to reduced effectiveness of the sealing rings 62, 70 of the MTF assembly 28. In other words, the disclosed configuration may allow to maintain proper cooling of the LPT outer case 36 even if effectiveness of the sealing rings 62,70 that seal the MTF plenum 60 become less effective with time or due to other factors. Therefore, containment capabilities of the LPT outer case 36 may be maintained even if effectiveness of the sealing rings 62, 70 were to decrease.

The different apertures via which the cooling air flow may be sized to be able to create choke to achieve full de-sensitization. Full de-sensitization would require operating the concept at sufficiently elevated pressure ratio across orifices 93B, such that the compressible air flow through these orifices is maximized. If this were the case, the cooling air feed to the LPT plenum 92 may become fully independent on the sealing efficiency of the sealing rings 62, 70.

Figure 4:
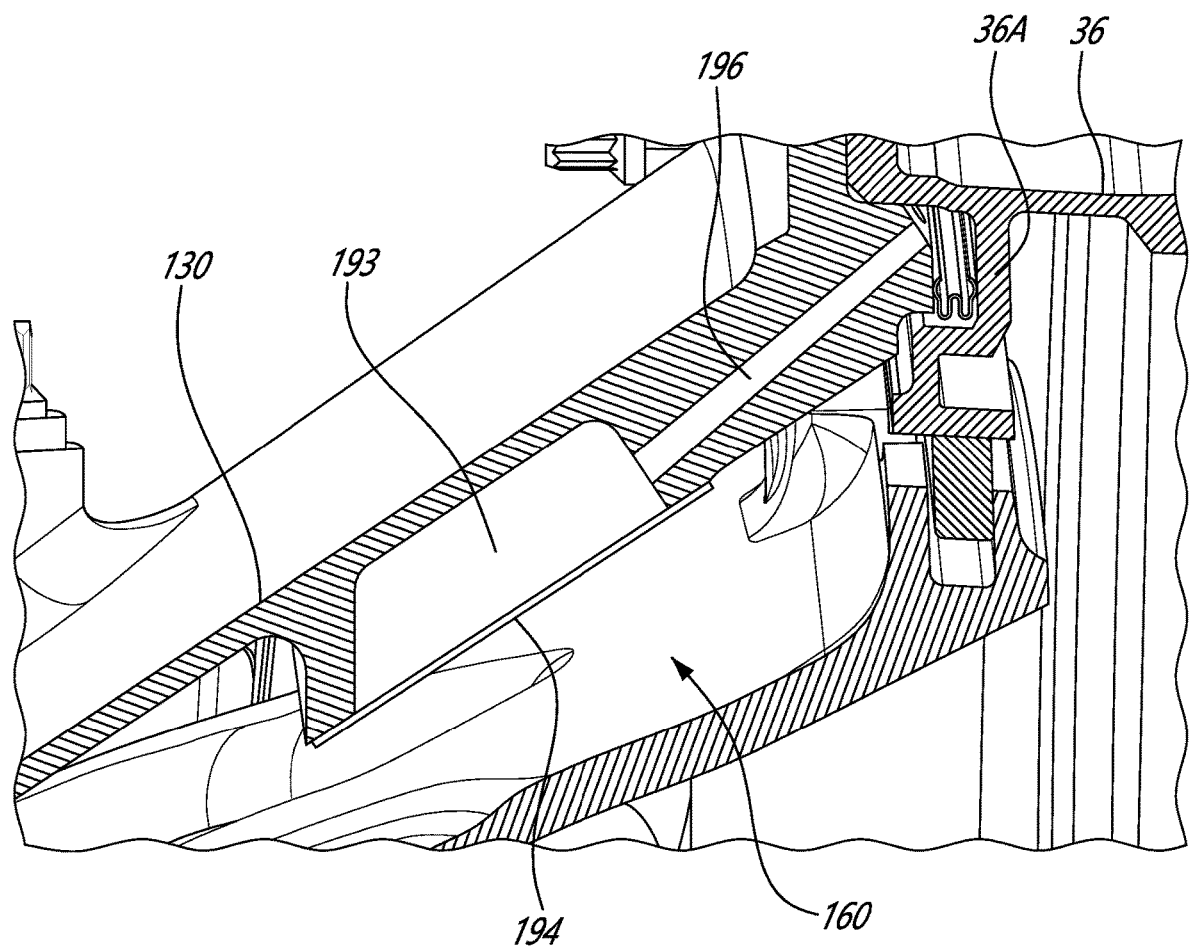
FIG. 4 is a cutaway view of a mid-turbine frame assembly in accordance with another embodiment.

Referring now to FIG. 4, an alternate embodiment of the MTF assembly is shown at 128. For the sake of conciseness, only elements that differ from the MTF assembly 28 of FIGS. 2-3 are described below.

In the embodiment shown, intermediary plenum 193 and the cooling air conduit 196 are defined within a thickness of the MTF outer case 130. In other words, the cooling air conduit 196 may be one or more passage(s) defined by the MTF outer case 130. The intermediary plenum 193 may be an annular groove circumferentially extending around the central axis. The annular plate 194 sealingly engages the MTF outer case 130 to separate the MTF plenum 160 from the intermediary plenum 193. Although not shown on FIG. 4, a plurality of circumferentially distributed apertures may be provided through the MTF outer case 130 to feed air to the intermediary plenum 193.

Referring now to FIG. 5, a method of feeding cooling air to the LPT plenum 92 is shown at 500. The method 500 includes receiving a flow of cooling air inside the intermediary plenum 93 at 502; delivering a first portion of the received flow of cooling air from the intermediary plenum 93 to the MTF plenum 60 at 504; and delivering a second portion of the received flow of cooling air into the LPT plenum 92 while bypassing the MTF plenum 60 at 506

In the embodiment shown, the receiving of the flow of cooling air inside the intermediary plenum 93, 193 at 502 includes receiving the flow of cooling air inside the intermediary plenum 93, 193 being located inside the MTF plenum 60. The delivering of the second portion of the received flow of cooling air at 504 may include flowing the second portion within a plurality of cooling air conduits 96 fluidly connecting the second outlets 93C of the intermediary plenum 93 to the LPT plenum 92.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A gas turbine engine comprising:
a high-pressure turbine;
a low-pressure turbine (LPT) downstream of the high-pressure turbine and having a LPT outer case and a LPT plenum extending circumferentially around a central axis, the LPT plenum distributing cooling air around the low-pressure turbine;
a mid-turbine frame (MTF) assembly connecting the low-pressure turbine and the high-pressure turbine, the MTF assembly having:
a MTF outer case defining an inlet for connection to a source of the cooling air,
an intermediary plenum fluidly connected to the source of cooling air via the inlet, the intermediary plenum having a first air outlet and a second air outlet, and
a MTF plenum disposed radially inwardly of the MTF outer case and fluidly connected to the source of the cooling air via the first air outlet of the intermediary plenum; and
a cooling air conduit fluidly connecting the second air outlet of the intermediary plenum to the LPT plenum while bypassing the MTF plenum.

2. The gas turbine engine of claim 1, wherein the intermediary plenum is located radially inwardly of the MTF outer case relative to the central axis.

3. The gas turbine engine of claim 1, comprising two protrusions being axially spaced apart from one another relative to the central axis and extending from the MTF outer case in a direction having a radial component relative to the central axis, the two protrusions extending circumferentially around the central axis, the intermediary plenum being disposed between the two protrusions.

4. The gas turbine engine of claim 3, comprising an annular plate sealingly engaged to distal ends of the two protrusions, the intermediary plenum located radially between the annular plate and the MTF outer case and axially between the two protrusions.

5. The gas turbine engine of claim 3, wherein the first air outlet is a first aperture defined through a first protrusion of the two protrusions, the second air outlet is a second aperture defined through a second protrusion of the two protrusions.

6. The gas turbine engine of claim 5, wherein the first aperture includes a plurality of first apertures distributed around the central axis, the second aperture including a plurality of second apertures distributed around the central axis.

7. The gas turbine engine of claim 1, wherein the cooling air conduit includes a plurality of cooling air conduits circumferentially distributed about the central axis.

8. The gas turbine engine of claim 7, wherein each of the plurality of the cooling air conduits is fluidly connected to a respective one of a plurality of apertures defined through the LPT case and distributed around the central axis, each of the plurality of apertures communicating with the LPT plenum.

9. The gas turbine engine of claim 1, wherein the cooling air conduit is defined within a thickness of the MTF outer case.

10. The gas turbine engine of claim 1, wherein an outlet of the cooling air conduit is fluidly connected to a second intermediary plenum, the second intermediary plenum defined between an end of the MTF outer case and a flange of the LPT outer case, the flange of the LPT outer case defining an aperture fluidly connecting the second intermediary plenum to the LPT plenum.

11. A mid-turbine frame (MTF) assembly for connecting a low-pressure turbine to a high-pressure turbine of a gas turbine engine, comprising:
a MTF outer case extending circumferentially around a central axis, the MTF outer case having an inlet for connection to a source of cooling air;
a MTF plenum disposed radially inwardly of the MTF outer case and fluidly connected to the inlet;
an intermediary plenum within the MTF plenum, the intermediary plenum having a first outlet and a second outlet, the first outlet fluidly connecting the intermediary plenum to the MTF plenum; and
a cooling air conduit fluidly connected to the second outlet of the intermediary plenum, the cooling air conduit fluidly connecting the intermediary plenum to a low-pressure turbine plenum independently of the MTF plenum.

12. The MTF assembly of claim 11, comprising two protrusions being axially spaced apart from one another relative to the central axis and extending from the MTF outer case in a direction having a radial component relative to the central axis, the two protrusions extending circumferentially around the central axis, the intermediary plenum being disposed between the two protrusions.

13. The MTF assembly of claim 12, comprising an annular plate sealingly engaged to distal ends of the two protrusions, the intermediary plenum located radially between the annular plate and the MTF outer case and axially between the two protrusions.

14. The MTF assembly of claim 13, wherein the first outlet is a first aperture defined through a first protrusion of the two protrusions, the second outlet is a second aperture defined through a second protrusion of the two protrusions.

15. The MTF assembly of claim 14, wherein the first aperture includes a plurality of first apertures distributed around the central axis, the second aperture including a plurality of second apertures distributed around the central axis.

16. The MTF assembly of claim 15, wherein the cooling air conduit includes a plurality of cooling air conduits circumferentially distributed about the central axis.

17. The MTF assembly of claim 11, wherein the cooling air conduit is defined within a thickness of the MTF outer case.

18. A method of feeding cooling air to a plenum surrounding a low-pressure turbine (LPT) of a gas turbine engine, the gas turbine engine having a mid-turbine frame (MTF) assembly connecting a high-pressure turbine to the low-pressure turbine, comprising:
receiving a flow of cooling air inside an intermediary plenum;
delivering a first portion of the received flow of cooling air from the intermediary plenum to a mid-turbine frame (MTF) plenum of the mid-turbine frame; and
delivering a second portion of the received flow of cooling air into the plenum surrounding the low-pressure turbine while bypassing the MTF plenum.

19. The method of claim 18, wherein the receiving of the flow of cooling air inside the intermediary plenum includes receiving the flow of cooling air inside the intermediary plenum located inside the MTF plenum.

20. The method of claim 18, wherein the delivering of the second portion of the received flow of cooling air includes flowing the second portion within a plurality of cooling air conduits fluidly connecting outlets of the intermediary plenum to the LPT plenum.

* * * * *